US007484814B2

(12) United States Patent
Dornbach

(10) Patent No.: US 7,484,814 B2

(45) Date of Patent: Feb. 3, 2009

(54) HYDRAULIC SYSTEM WITH ENGINE ANTI-STALL CONTROL

(75) Inventor: David A. Dornbach, Waukesha, WI (US)

(73) Assignee: HUSCO International, Inc., Waukesha, WI (US)

( * ) Notice: Subject to any disclaimer, the term of this patent is extended or adjusted under 35 U.S.C. 154(b) by 557 days.

(21) Appl. No.: 11/367,847

(22) Filed: Mar. 3, 2006

(65) Prior Publication Data

US 2007/0210645 A1 Sep. 13, 2007

(51) Int. Cl.
*F16D 31/02* (2006.01)

(52) U.S. Cl. .................... 303/3; 303/7; 60/422; 60/431

(58) Field of Classification Search ..................... 303/3, 303/7, 20; 60/421, 422, 431
See application file for complete search history.

(56) References Cited

U.S. PATENT DOCUMENTS

| | | | | |
|---|---|---|---|---|
| 5,277,269 | A * | 1/1994 | Ichimura et al. | 180/306 |
| 5,617,724 | A | 4/1997 | Ko | |
| 5,638,677 | A * | 6/1997 | Hosono et al. | 60/431 |
| 6,098,403 | A | 8/2000 | Wilke | |
| 6,226,987 | B1 * | 5/2001 | Hayashi et al. | 60/447 |
| 7,047,735 | B2 * | 5/2006 | Sprinkle et al. | 60/422 |
| 7,165,397 | B2 * | 1/2007 | Raszga et al. | 60/431 |
| 2007/0283688 | A1 * | 12/2007 | Vigholm et al. | 60/327 |
| 2008/0223026 | A1 * | 9/2008 | Schuh et al. | 60/421 |

* cited by examiner

*Primary Examiner*—Christopher P Schwartz
(74) *Attorney, Agent, or Firm*—Quarles & Brady LLP

(57) ABSTRACT

A hydraulic system has first and second functions in which separate control valves govern the flow of fluid between actuators and both a supply conduit and a return conduit. The second function is connected to a load sense passage. When pressure in the load sense passage exceeds a given level an anti-stall valve opens a restricted path between the supply and return conduits. Fluid flow through that restricted path reduces a likelihood that a prime mover driving the pump of the hydraulic system will stall. When only the first function is active the anti-stall valve is closed and does not affect the supply of fluid to that function.

19 Claims, 2 Drawing Sheets

HYDRAULIC SYSTEM WITH ENGINE ANTI-STALL CONTROL

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulic systems that independently control the operation of a plurality of hydraulic actuators on a vehicle that is powered by an engine, and more particularly to such hydraulic systems that include a mechanism which prevents the engine from stalling when the hydraulic system suddenly demands increased power from the engine.

2. Description of the Related Art

Numerous types of machines have components that are moved by a hydraulic system. For example, a various vehicles used in construction and agriculture have an internal combustion engine which drives a pump to provide pressurized fluid for powering different hydraulic functions, such as lifting the objects and working the ground. This vehicle has body to which a boom is pivotally attached and able to be raised and lowered by a first hydraulic cylinder. A work member, such as a bucket or load carrying platform, pivots about the remote end of the boom in response to a second hydraulic cylinder. Pressurized fluid from the pump is applied to the first and second\ cylinders by the operator manipulating separate valves which control the rate and direction of fluid flow so that the cylinders operate in a manner that produces the desired motion of the boom or work member.

When the vehicle is stationary, the engine often operates at a relatively slow idle speed. In this situation, when the operator desires to raise the work member, the engine may not be able to supply sufficient horsepower to satisfy the demands of the hydraulic actuator. For example, the load member strikes mechanical stops at the extreme ends of the pivot motion. Keeping the associated control valve open thereafter causes pressure in the hydraulic system to rise dramatically. At idle speed the engine may be incapable of generating and sustaining the required torque necessary for the hydraulic pump to supply fluid at that increased pressure. In that case, the engine speed decreases rapidly until the engine stalls. The engine usually stalls before the pressure reaches a level at which a conventional pressure relief valve opened.

Heretofore engine stalling was prevented by placing a bypass path between the pump output and the return conduit leading to the system fluid reservoir. This path had an orifice through which fluid continuously flowed from the pump to the tank. This restricted flow path effectively reduced the opening pressure characteristic of the conventional pressure relief valve, thereby limiting the amount of pressure that the control valves for the hydraulic functions can provide when the pump output is low. However, this approach has the disadvantage of creating a continuous flow loss to the tank which in some applications was unacceptable because fluid is routed away from the active hydraulic actuator. For example in a lift truck, the flow through the bypass path significantly reduces the speed at which the load carrying member can be raised.

Therefore, a need exists form an improved mechanism to prevent the engine from stalling when the hydraulic system demands a level of power that can not be satisfied by the engine.

SUMMARY OF THE INVENTION

A hydraulic system comprises a supply conduit that receives fluid under pressure from a source and return conduit for conveying fluid back to the source. A first hydraulic function includes a first hydraulic actuator that receives fluid from the supply conduit and exhausts fluid into the return conduit. In a preferred embodiment, a first control valve governs the flow of that fluid, thereby controlling the direction and rate that the first hydraulic actuator moves. A second hydraulic function has a second hydraulic actuator that receives fluid from the supply conduit and exhausts fluid into the return conduit. Preferably, a second control valve governs that fluid flow so as to control the direction and rate at which the second hydraulic actuator moves.

A first load sense passage receives a load pressure from the second hydraulic function. An anti-stall valve provides a restricted flow path between the supply conduit and the return conduit in response to pressure in the first load sense passage exceeding a predefined magnitude.

When the second hydraulic function is active and the second hydraulic actuator is moving, the anti-stall valve opens the restricted flow path to reduce a likelihood that pressure in the supply conduit will cause the prime mover to stall. However, operation of the first hydraulic function does not cause the anti-stall valve to open and thus the restricted flow path does not affect the hydraulic system when only the first hydraulic function is active.

DETAILED DESCRIPTION OF THE INVENTION

Figure 1:
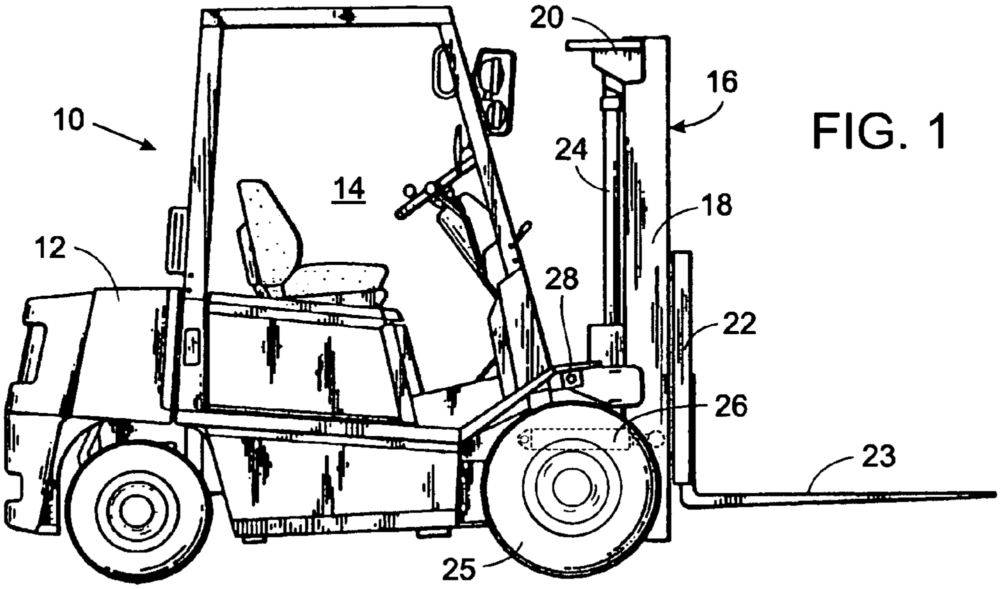
FIG. 1 is a side view of a lift truck that incorporates a hydraulic system that has an anti-stall valve according to the present invention.

The present invention will be described in the context of a hydraulic system for a lift truck 10 shown in FIG. 1, with the understanding that the inventive concepts can be applied other machines in which a hydraulic system is powered by an engine.

The exemplary lift truck 10 includes a body 12 with an operator compartment 14. A multiple section, telescopic mast 16 is attached to the front of the body and includes a base section 18 and one or more telescopic sections 20 nested within the base section. A fork carriage 22 with load carrying forks 23 is slidably mounted to one of the telescopic sections and is moved up and down by a lift cylinder 24. Typically the lift cylinder 24 is connected to a mechanism (not shown) comprising chains which pass over pulleys to extend and retract the telescopic sections 20 relative to the base section 18. A tilt cylinder 26, horizontally mounted between the front wheels 25 of the lift truck 10, is attached to the body 12 and the lower end of the mast base section 18. The tilt cylinder 26 pivots the telescopic mast 16 about a horizontal shaft 28 to tilt the ends of the forks 23 up and down to hold the load thereon. The hydraulic fluid that drives the lift and tilt cylinders 24 and 26 is controlled by valves that are operated by controls in the operator compartment 14.

Figure 2:
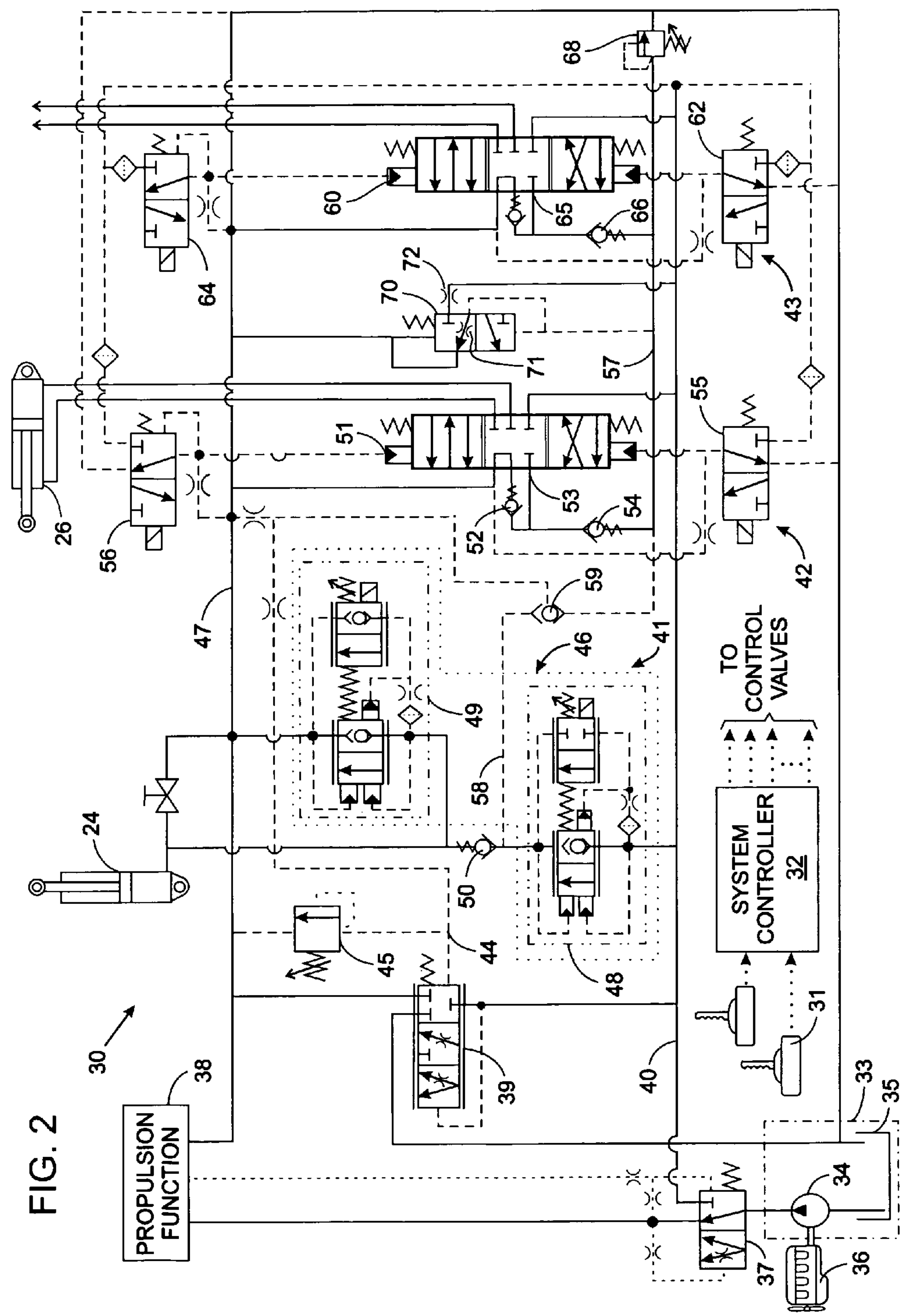
FIG. 2 is a schematic diagram of the hydraulic system.

With reference to FIG. 2, the hydraulic system 30 for the lift truck 10 has a joystick 31 that upon being manipulated by an operator produces an electrical signal indicating the desired motion for a component of the machine. The joystick signals are applied as inputs to an electronic controller xxxx which then produces output signals for activating solenoid operated valves that control the flow of hydraulic fluid to the cylinders 24 and 26 on the lift truck 10.

The hydraulic system 30 comprises source 33 of pressurized fluid that includes a pump 34 which draws fluid from a tank 35. The pump is driven by a prime mover, such as an internal combustion engine 36. A pressure control valve 37 responds to the pressure demands of a propulsion function 38 which drives the wheels 25 of the lift truck 10 to ensure that those pressure demands are met. Any pump output fluid remaining after satisfying the demands of the propulsion function 38 is furnished via a supply conduit 40 to the other hydraulic functions 41, 42, and 43. On this exemplary machine, there is a single primary hydraulic function 41 which operates the lift cylinder 24 to raise and lower the mast 16, and there are two secondary hydraulic functions 42 and 43. However, other machines may have other numbers of primary and secondary hydraulic functions.

A conventional pressure compensation valve 39 ensures that the pressure within the supply conduit 40 is sufficient to meet the highest pressure demanded by the other hydraulic functions 41, 42 or 43. The pressure compensation valve 39 responds to the difference between pressure in the supply conduit 40 and pressure in an output load sense passage 44 that indicates the greatest pressure demanded by those hydraulic functions. A primary pressure relief valve 45 limits the load sense pressure signal in passage 44 to a maximum pressure level (e.g. 200 bar) which is the primary pressure setting for the hydraulic system 30.

The primary, or first, hydraulic function 41 controls the operation of the lift cylinder 24 and employs a control valve 46 formed by a pair of proportional, pilot-operated poppet valves 48 and 49, such as are described in U.S. Pat. No. 6,745,992. The first of these pilot-operated poppet valves 48 is coupled in series with a load check valve 50 between the supply conduit 40 and the head chamber of the lift cylinder 24. Pressurized fluid is only applied to the head chamber of the lift cylinder 24 to raise the mast 16, because the force of gravity is used to lower the mast. The second pilot-operated poppet valve 49 is coupled between the lift cylinder 24 and a return conduit 47 which leads to the tank 35.

Hydraulic system 30 has two secondary functions 42 and 43. The second hydraulic function 42 controls the tilt cylinder 26 on the lift truck 10 and employs a second control valve 51 with a spool that is operated by hydraulic pressure applied to each end. Those pressures are controlled by a pair of solenoid valves 55 and 56. Applying pressurized fluid to one end of the second control valve spool and relieving the pressure at the opposite end to the return conduit 47 moves the spool into one of two open states, thereby sending fluid from the supply conduit 40 to one chamber of the tilt cylinder 26 and exhausting fluid from the other chamber to the return conduit. A conventional load check valve 52 prevents the flow of fluid backward from the tilt cylinder 26 to the supply conduit 40.

The third function 43 is similar to the second function and is provided to power an auxiliary device on the lift truck 10. The third function 43 has a third control valve 60 with a spool that moves in response to pressure applied to its ends by a pair of solenoid valves 62 and 64.

The second control valve 51 has a port 53 that is coupled by a check valve 54 to a first load sense passage 57 and the third control valve 60 has a port that is connected by a check valve 66 to the relief pressure passage. The first load sense passage 57 is coupled by a secondary pressure relief valve 68 to the tank return conduit 47 when pressure in that passage exceeds a predefine threshold. In addition, the first load sense passage 57 is connected to one input of a conventional load sense shuttle valve 59. The other input of the load sense shuttle valve 59 is connected by a second load sense passage 58 to the outlet of the first control valve 48 for the primary hydraulic function 41 and thus receives a load pressure corresponding to the external force acting on the lift cylinder 24. The output pressure of the load sense shuttle valve 59 corresponds to the greater load pressure from either the first hydraulic function 41 or the first load sense passage 57 which carries the greater load pressure from the second and third hydraulic functions 42 and 43. The output pressure of the load sense shuttle valve 59 is applied via an output load sense passage 44 to the pressure compensation valve 39.

When only the secondary functions 42 and 43 are active, the pressure from the first load sense passage 57 is conveyed by the load sense shuttle valve 59 through the output load sense passage 44 to the pressure compensation valve 39. That pressure from the secondary functions controls operation of the pressure compensation valve 39, thereby governing the pressure in the supply conduit 40. Specifically, supply conduit pressure will be equal to the load sense passage plus a margin set by the spring force acting on the pressure compensation valve. When only the primary function 41 is active, its load pressure is applied through the load sense shuttle valve 59 and the output load sense passage 44 to the pressure compensation valve 39. In situations where both the primary and secondary functions are active, the greatest load pressure from among them is conveyed by the load sense shuttle valve 59 and the output load sense passage 44 to the pressure compensation valve 39 for governing the pressure in the supply conduit 40.

The primary and secondary pressure relief valves 45 and 68 independently limit the maximum pressure that is applied to the primary and secondary hydraulic functions, respectively. The output pressures of the secondary hydraulic functions 42 and 43 are conveyed from the respective port 53 or 65 of the second and third control valves 51 and 60 into the first load sense passage 57. If both secondary hydraulic functions are simultaneously active only the greater output pressure is passed by the check valves 54 and 66 into the first load sense passage 57. When the first load sense passage pressure exceeds the setting of the secondary pressure relief valve 68 that valve opens releasing the pressure to the return conduit 47, thereby limiting the maximum output pressure of the secondary hydraulic functions 42 and 43.

The primary pressure relief valve 45 prevents the output pressure of the first, or primary, hydraulic function 41 from exceeding its maximum permitted limit. Because the relatively lower threshold of the secondary pressure relief valve 68 allows the first hydraulic function 41 to have a greater that the maximum pressure than the secondary functions 42 or 43, that greater load pressure from the first hydraulic function 41 is conveyed through the shuttle valve 59 and the output load sense passage 44 to the primary pressure relief valve 45. That latter relief valve 45 opens when its pressure setting is exceeded, thereby releasing the pressure to the return conduit 47. This limits the pressure in the output load sense passage 44 which in turn controls the operation of the conventional pressure compensation valve 39 to limit pressure that can occur in the supply conduit 40. The shuttle valve 59 blocks the greater output pressure of the first hydraulic function 41 from reaching the secondary pressure relief valve 68 which has a lower pressure setting. Therefore, the secondary pressure relief valve 68 governs only the secondary hydraulic functions 42 and 43 and the primary pressure relief valve 45 effectively limits pressure to only the primary hydraulic function 41.

An anti-stall valve 70 is connected in series with an orifice 72 between the supply conduit 40 and the return conduit 47. This valve has a spool that is biased by a spring at one end into a normal position illustrated in FIG. 2 in which the path between the supply and return conduits is closed. The pressure in the return conduit 47 is applied to that one end of the valve spool and pressure in the first load sense passage 57 is applied to that the other end of the valve spool. In the closed state of the anti-stall valve 70 a small bleed orifice 71 provides a path through which pressure in the between the first load sense passage 57 bleeds into the return conduit 47 so that pressure is not trapped in that passage. However, the relatively small size of that bleed orifice does not adversely affect the pressure relief and load sense activity, nor operation of the secondary hydraulic functions.

When there is relatively low pressure (e.g. less than 4 bar) in the first load sense passage 57, the force of the spring closes the anti-stall valve 70. Therefore, none of the output from the pump 34 is diverted directly to the tank 35 and thus the full output is available for powering the primary, or first, hydraulic function 41. When at least one of the secondary functions 42 or 43 is active and pressure in the first load sense passage 57 exceeds a given threshold (e.g. 4 bar), the anti-stall valve 70 shifts to the open position. This provides a restricted flow path through the orifice 72 between the supply and return conduits 40 and 47. The secondary functions 42 and 43, as opposed to the primary lift function 41, are capable of tolerating some loss of fluid through this restricted flow path. It should be understood that the orifice 72 can be incorporated into the anti-stall valve 70 such that the orifice is connected between the supply and return conduits when the valve is shifted into the open position. When the orifice 72 is incorporated into the anti-stall valve 70, those two components are still considered as being connected in series.

Figure 3:
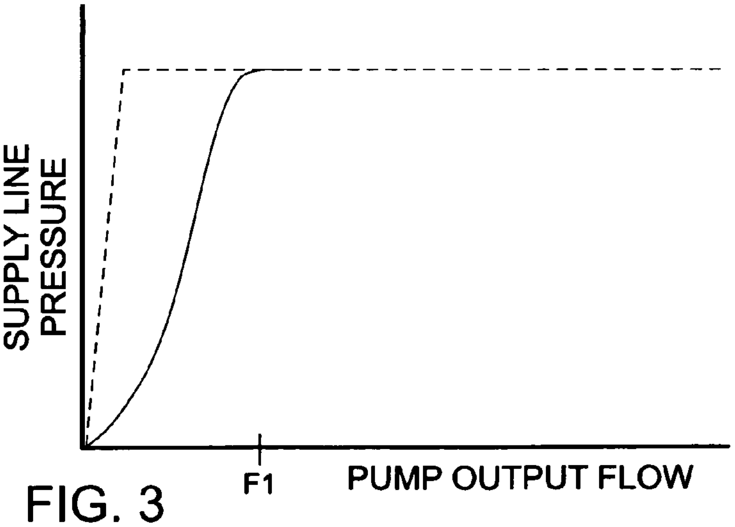
FIG. 3 is a graph depicting the relationship of the pressure and fluid flow with and without the anti-stall valve.

Assume for example that the operator is tilting the mast 16 by operating the second hydraulic function 42 while the engine 36 is idling. When the mast 16 reaches the end tilt position, fluid stops flowing from the second control valve 51 into the tilt cylinder 26, thereby increasing pressure in the supply line 40 and the first load sense passage 57. Without the anti-stall valve 70, the supply line pressure would rapidly increase, as shown by the dashed line in FIG. 3, which produces a load on the pump 34 that cannot be handled by the idling engine, thereby causing the engine 36 to stall. Note that the engine usually stalls before the pressure rises to a level at which the secondary pressure relief valve 68 opens and relieves the demand on the pump 34. However, the pressure rise causes the anti-stall valve 70 to open. That action provides a restricted flow path through the anti-stall valve and the orifice 72 preventing the supply conduit pressure from exceeding the level at which the engine will stall, as shown by the solid line in FIG. 3. The orifice 72 is sized to conduct a sufficiently large flow at the engine idle speed so that the pressure load on the pump will be too small to stall the pump 34.

It should be noted that the mast 16 typically is never raised so high as to reach the upper mechanical limit as the lift truck is commonly purchased with a mast height that exceeds the greatest height required in the factory or warehouse. Therefore, operation of the mast usually does not cause the engine to stall. As a consequence, the anti-stall valve 70 only responds to the pressure from the secondary hydraulic functions 42 and 43, and not the primary hydraulic function 41 that controls the lift cylinder 24.

When the engine 36 is operating at a normal speed, i.e. not idling, the higher pump output is practically unaffected by the small restricted flow through the anti-stall valve 70 and the orifice 72. Therefore, under this condition the anti-stall valve 70 does not affect operation of the secondary pressure relief valve 68 should an excessive pressure condition occur.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A hydraulic system comprising:

a supply conduit receiving fluid under pressure from a source;

a return conduit for conveying fluid back to the source;

a first hydraulic actuator and a second hydraulic actuator;

a first control valve connected to the supply conduit, the return conduit and the first hydraulic actuator, and controlling flow of fluid between the first hydraulic actuator and both of the supply conduit and the return conduit;

a second control valve connected to the supply conduit, the return conduit and the second hydraulic actuator, and controlling flow of fluid between the second hydraulic actuator and both of the supply conduit and the return conduit;

a first load sense passage receiving a first load pressure indicating a force acting on the second hydraulic actuator and being isolated from effects of a force acting on the first hydraulic actuator; and an anti-stall valve coupled to the supply conduit and the return conduit and providing a flow path there between in response to pressure in the first load sense passage exceeding a predefined magnitude.

2. The hydraulic system as recited in claim 1 further comprising a flow restriction orifice in series with the anti-stall valve between the supply conduit and the return conduit.

3. The hydraulic system as recited in claim 1 further comprising a pressure relief valve providing a fluid path between the first load sense passage and the return conduit in response to pressure in the first load sense passage exceeding a given level.

4. The hydraulic system as recited in claim 1 further comprising a second load sense passage receiving a second load pressure indicating a force acting on the first hydraulic actuator; and logic element for selecting as a load sense pressure whichever of the first load pressure and the second load pressure is greater.

5. The hydraulic system as recited in claim 4 further comprising a pressure compensation valve responsive to the load sense pressure for limiting pressure in the supply conduit to a defined level.

6. The hydraulic system as recited in claim 5 further comprising:

a first pressure relief valve which limits the load sense pressure to less than a predefined level; and a second pressure relief valve providing a fluid path between the first load sense passage and the return conduit in response to pressure in the first load sense passage exceeding a given level.

7. The hydraulic system as recited in claim 1 further comprising:

a third hydraulic actuator;

a third control valve connected to the supply conduit, the return conduit and the third hydraulic actuator, and controlling flow of fluid between the second hydraulic actuator and both of the supply conduit and the return conduit;

a first check valve through which the first load pressure is communicated to the first load sense passage; and a second check valve through which a second load pressure indicating a force acting on the second hydraulic actuator is communicated to the first load sense passage, wherein the first check valve and the second check valve apply whichever of the first load pressure and second load pressure is greater to the first load sense passage.

8. A hydraulic system comprising:

a supply conduit receiving fluid under pressure from a source;

a return conduit for conveying fluid back to the source;

a first hydraulic function having a first hydraulic actuator that receives fluid from the supply conduit and exhausts fluid into the return conduit;

a second hydraulic function having a second hydraulic actuator that receives fluid from the supply conduit and exhausts fluid into the return conduit;

a first load sense passage receiving a first load pressure from the second hydraulic function; and an anti-stall valve coupled to the supply conduit and the return conduit and providing a restricted flow path there between in response to pressure in the first load sense passage exceeding a predefined magnitude.

9. The hydraulic system as recited in claim 8 wherein the restricted flow path is formed by an orifice in series with the anti-stall valve between the supply conduit and the return conduit.

10. The hydraulic system as recited in claim 8 further comprising a pressure relief valve providing a fluid path between the first load sense passage and the return conduit in response to pressure in the first load sense passage exceeding a given level.

11. The hydraulic system as recited in claim 8 further comprising a second load sense passage receiving a second load pressure from the first hydraulic function; and logic element for selecting as a load sense pressure whichever of the first load pressure and the second load pressure is greater.

12. The hydraulic system as recited in claim 11 further comprising a pressure compensation valve which responds to the load sense pressure by limiting pressure in the supply conduit to a defined level.

13. The hydraulic system as recited in claim 11 further comprising:

a first pressure relief valve which limits the load sense pressure to less than a predefined level; and a second pressure relief valve providing a fluid path between the first load sense passage and the return conduit in response to pressure in the first load sense passage exceeding a given level.

14. The hydraulic system as recited in claim 8 further comprising:

a third hydraulic function having a third hydraulic actuator that receives fluid from the supply conduit and exhausts fluid into the return conduit;

a first check valve through which the first load pressure is communicated to the first load sense passage; and a second check valve through which a second load pressure from the third hydraulic function is communicated to the first load sense passage, wherein the first check valve and the second check valve apply whichever of the first load pressure and second load pressure is greater to the first load sense passage.

15. A hydraulic system in which a prime mover drives a pump that draws fluid from a tank and has an output, the hydraulic system comprising:

a supply conduit coupled to the output of the pump;

a return conduit for conveying fluid to the tank;

a first hydraulic function having a first hydraulic actuator that is coupled by a first control valve to at least one of the supply conduit and the return conduit;

a second hydraulic function having a second hydraulic actuator that is coupled by a second control valve to at least one of the supply conduit and the return conduit;

a third hydraulic function having a third hydraulic actuator that is coupled by a third control valve to at least one of the supply conduit and the return conduit;

a first load sense passage receiving a greater of a first load pressure indicating a force acting on the second hydraulic actuator and a second load pressure indicating a force acting on the third hydraulic actuator, wherein the first load sense passage is isolated from effects of forces acting on the first hydraulic actuator; and an anti-stall valve coupled to the supply conduit and the return conduit and providing a restricted flow path there between in response to pressure in the first load sense passage exceeding a predefined magnitude.

16. The hydraulic system as recited in claim 15 further comprising a second load sense passage receiving a load pressure from the first hydraulic function; and logic element for selecting as a load sense pressure whichever pressure in the first load sense passage and the second load sense passage is greater.

17. The hydraulic system as recited in claim 16 further comprising a pressure compensation valve which responds to the load sense pressure by limiting pressure in the supply conduit to a defined level.

18. The hydraulic system as recited in claim 16 further comprising:

a first pressure relief valve which limits the load sense pressure to less than a predefined level; and a second pressure relief valve providing a fluid path between the first load sense passage and the return conduit in response to pressure in the first load sense passage exceeding a given level.

19. The hydraulic system as recited in claim 16 further comprising:

a first check valve through which the first load pressure is communicated to the first load sense passage; and a second check valve through which a second load pressure is communicated to the first load sense passage, wherein the first check valve and the second check valve apply whichever of the first load pressure and second load pressure is greater to the first load sense passage.

* * * * *